UNITED STATES PATENT OFFICE 2,298,623

STEEP WATER TREATMENT

Reynold P. Jurgensen and Arthur G. Rohwer, Clinton, Iowa, assignors to Clinton Company, Clinton, Iowa, a corporation of Iowa No Drawing. Application April 8, 1940, Serial No. 328,532

10 Claims. (Cl. 99—2)

This invention relates to improvements in the treatment of steep water for the dual purpose of conditioning it for concentration and for improving its qualities for its ultimate use.

In the manufacture of starch from corn, it is customary to steep the corn in warm water to which sulphur dioxide is added to inhibit bacterial growth and to aid in dissolving the cementing material which retards permeation of the grain by the steeping water. The steeping of the corn, while having the important purpose of softening the kernels to facilitate the subsequent separation of the germ, the starch, and the gluten from each other, also extracts from the kernels a large amount of soluble matter which is removed from the system with the steep water.

These solubles, consisting of various mineral salts, protein substances, sugars, and other material, have a considerable value either as cattle feed or for industrial purposes and, while some industrial use is made of steep water in the concentration in which it is removed from the steeps, it generally has been customary in the industry to utilize it by concentrating the steep water to a syrupy liquid in evaporators and then mixing it with the feed prior to the final drying stage. This evaporation has been attended by serious difficulties characterized by scale formation on the tubes of the evaporators with consequent reduction in boiling capacity of the evaporators in proportion to the thickness of the scale.

It is noted that two kinds of scale are formed. One is a hard scale, believed to consist largely of mineral salts, while the other is a scale consisting largely of protein material which has some rubbery characteristics and is commonly termed "rubber scale." Normally, a considerable amount of either or both of these types of scale collects on the evaporator tubes during operation and forms a heat-insulating layer thereon. As would be expected, this deposition of heat-insulating scale causes serious operating difficulties.

In the recovery of the solubles and other matter in steep water, it has always been customary to evaporate the steep water under vacuum; in other words, at temperatures substantially below the boiling point of the liquid under atmospheric pressure.

The literature of this art reveals various attempts to cope with the above described difficulties, but none of these prior efforts has been regarded in the industry as a successful solution of the problem.

Our invention involves a discovery that by subjecting the steep water in mildly acid condition prior to evaporation to a heat treatment at elevated temperature, that is, higher than was heretofore customary or deemed advisable, an unexpected change takes place in the condition of the steep water solids. This change, or modification produces several new results. For example, the stability or keeping qualities of the steep water, without further treatment, are greatly increased, and the nutrient value and other values of the material are considerably enhanced. Also, and of great importance, the scaling or fouling of the evaporator surfaces during subsequent evaporation is practically eliminated. While it is not definitely understood just what changes occur during this treatment, it appears that various chemical and physical changes take place and some of the scale-forming substances are precipitated while others may be broken up into non-scaling compounds.

Whereas steep water not treated in accordance with this invention may only be concentrated readily in the evaporators to about 25° Baumé on account of the fouling of the evaporator tubes, steep water treated in accordance with this invention may be concentrated in the evaporators to about 32 to 35° Baumé or oven higher. The limiting factor in the case of current practice in the art is the insulating effect of the scale which is deposited on the heating surfaces. In the case of steep water treated in accordance with this invention, this limiting factor in the prior art is practically eliminated due to the inhibition of scaling, and in consequence higher concentrations can be attained which are limited only by the ability of the evaporator to efficiently handle the more concentrated viscous fluid.

The elimination of the heretofore troublesome scale formation in the evaporators increases the evaporation rate per square foot of heating surface, thereby permitting a reduction in total evoporating capacity required. Thus fewer or smaller evaporators are capable of performing the required evaporation and this results in reduced investment in process equipment and maintenance thereof.

Furthermore, the cleaner evaporating surfaces which result from the use of this process permit concentration to higher gravities in multiple effect evaporators. For instance, whereas prior to the present discovery a maximum density of about 25° Baumé could be attained in a multiple effect evaporator, we have found that steep water treated in accordance with the current invention may be evaporated to densities as high as 35° and even 37° Baumé in the same evaporator, if desired, and that such operation can be maintained over relatively long periods of time without cessation of operation for cleaning or any attendant difficulties. Those skilled in the art will readily recognize the steam economies available through the use of multiple effect evaporators in place of single effects to achieve this high degree of concentration.

Another advantage achieved by this process is that through the elimination of the fouling of the heating surfaces of the evaporator and the increased fluidity of the steep water it is possible to concentrate the steep water in vacuum evaporators to much higher gravities than was heretofore possible, thus reducing the evaporating load on the feed dryers when the steep water is used as an ingredient of feed. Since water can be removed more efficiently in the evaporators than in feed dryers, this additional water removal in the evaporators results in a saving in heat costs when the steep water is to be used in gluten feed.

A further advantage resides in the fact that steep water treated in accordance with this invention boils much more smoothly and evenly during subsequent concentration than does other steep water not so treated. This phenomenon results in a reduction of foaming and priming with the attendant entrainment and ultimate loss of steep water droplets in the vapor issuing from the evaporator.

The elimination of the scale formation also greatly reduces the frequency with which the evaporators must be cleaned resulting in a saving of materials, labor, and steam required for cleaning, and reducing the attendant temporary loss of use of the equipment during the cleaning process. Furthermore, this cleaning has customarily been accomplished by boiling out the evaporators with strong chemicals resulting in considerable corrosion and deterioration of the evaporating equipment. Tube leaks and equipment failure are minimized by eliminating the necessity for such frequent cleaning.

In addition to the increased economy of the evaporating process, the subjection of the steep water to these high temperatures results in a more complete sterilization of the steep water than has heretofore been attained. It is also believed that certain enzymes which may be present in steep water are inactivated at these high temperatures. This sterilization and inactivation of enzymes results in a more stable product, less subject to deterioration under normal conditions, increasing the keeping qualities of the steep water if stored thereafter or of the feed to which it may be added.

It has been further observed that during this process various protein substances, normally present in steep water in large quantities, apparently become partially digested or hydrolyzed rendering them more available for nutritional purposes. This not only results in a more available feeding substance when the steep water is used in cattle feed but also increases the value of the steep water as a nutrient in fermentation processes.

If the steep water is later to be used in processes wherein its color is an important factor, another advantage is gained from this process, since the color of the concentrated steep water is considerably lighter than that of steep water which has been evaporated to the same gravity otherwise than in accordance with this invention. However, if a darker colored steep water is desired, it may be obtained by increasing the temperature and/or length of the treatment.

These advantages are available either in batch processes or continuous processes, and as the latter are preferable, we will describe the invention as so used.

The steep water, having a pH of about 4 and a titrable acidity either natural or induced of about 10% to 30% acid (calculated as lactic acid and expressed as a percentage of the dry substance present), prior to admission to the evaporators, is heated in a pressure tank preferably by the injection of steam to a temperature corresponding to about 25 lbs. steam gauge pressure. The capacity of the tank and the rate of flow will be so regulated that the steep water is subjected for about 10 minutes to the temperature which may thus be obtained. Some variation is permissible at this point, in fact, the steep water may be subjected to as much as 50 lbs. of steam pressure, but only at this higher pressure and temperature if a darker colored steep water is permissible. Roughly, the temperature to which the steep water may be heated ranges from about 225° F. to 300° F.

After about 10 minutes of this heat treatment, the steam pressure is released, preferably by blowing the steep water into a tank equipped with an agitator, venting the steam which is flashed off either to the atmosphere or to some equipment suitable for the recovery of the heat contained therein. At this point it is noticed that a considerable amount of precipitate is present or forms in the steep water. The purpose of the agitator is to disperse the precipitate uniformly in the liquid phase. When the treated steep water is thereafter run through the evaporators and further concentrated, substantially none of the suspended matter or solids still in solution will collect on the walls or tubes of the evaporators. It is possible that with properly designed evaporators the treated steep water can be discharged directly from the pressure vessels into the evaporator.

While it is emphasized that the solids precipitated during this treatment will not form scale during subsequent evaporation of the steep water and for cattle food purposes will not be separated, yet for other purposes we may separate these solids by any practical means before evaporating the water.

The extent or manner of treatment may be varied somewhat in several respects, for example, the duration of the heat treatment may be increased or decreased with decreases or increases of temperature to compensate for the variation of time. The preferred time range is 10 to 20 minutes but, at most, less than a half hour. Also, variations in the acidity of the steep water affect the time and/or temperature necessary to accomplish the desired results, increasing acidities warranting a corresponding decrease in either or both of the other two variables. It is sufficient to note that if the treatment is inadequate, there will be some deposit of the soluble or suspended materials on the heating surfaces of the evaporators. On the other hand, if the steep water is subjected to conditions much more severe than these herein set forth for any considerable length of time, the subsequently concentrated steep water may be too dark in color or may have a burnt taste and odor.

It should be pointed out that the contents of the steep water will vary in accordance with variations in or peculiarities of the corn being steeped, and also in accordance with the particular steeping procedure employed. Normally, any steep water will have or can be modified to attain the acid condition herein described and referred to as a mildly acid condition, which is implied if not otherwise defined in the claims.

It should be understood that the invention described herein is susceptible of some variation in the procedures outlined above not inconsistent with the desired objects and without departing from the scope of the following claims.

Having shown and described our invention, we claim:

1. A method of treating steep water derived from corn steeps in mildly acid condition comprising heating the steep water under pressure to temperatures ranging between 225° F. and 300° F. for a time sufficient to modify by such heat treatment the material therein contained whereby its scale forming tendencies are reduced upon subsequent evaporation.

2. A method of conditioning and evaporating steep water consisting in heating the steep water to a range of about 225° F. to 300° F. for a period of about 5 to 30 minutes to reduce its scale forming tendencies during evaporation, thereafter flashing off the steam, and evaporating the steep water to a desired consistency at temperatures below 212° F.

3. A method of conditioning steep water for subsequent evaporation consisting in heating the steep water to between about 225° F. to 300° F. and maintaining the said temperature long enough to modify the scale-forming substances, thereafter cooling the steep water to a temperature below 212° F. and concentrating it by evaporation to a density range from 20° Bé. to 35 Bé. without scale formation.

4. A method of conditioning and evaporating steep water comprising subjecting steep water, having a pH of approximately 4, to a temperature of 225° F. to 300° F. for a period of time just sufficient to modify and condition the solids and solubles therein contained whereby no deposit thereof will occur on the heating surfaces during subsequent evaporation, and evaporating the steep water thereafter while containing those solids at atmospheric or lower pressure until the desired concentration is attained.

5. A method of conditioning steep water which comprises subjecting it to a temperature of about 225° F. to 300° F. by direct injection of steam until the scale-forming substances therein are converted into non-scale forming substances and thereafter evaporating the steep water.

6. A method of conditioning and evaporating steep water comprising heating the steep water under pressure by direct injection of steam to a temperature substantially in excess of 212° F. long enough to modify the scale-forming substances therein and thereafter evaporating the steep water at substantially reduced temperatures without deposition of scale-forming substances on the evaporator heating surfaces.

7. A method of conditioning and evaporating steep water comprising pre-heating the steep water under pressure by direct injection of steam to a temperature substantially in excess of 212° F. to convert the scale-forming substances into substances which will not form scale in the subsequent evaporation step, and thereafter evaporating the steep water without separation of the solids therefrom at temperatures below the atmospheric boiling point of the liquid without scale formation on the evaporator surfaces.

8. A method of conditioning steep water prior to evaporation, consisting in subjecting it at about 4.0 pH and at about 20% titrable acidity (calculated as lactic acid and expressed as a percentage of the total dry substance) to a temperature of about 267° F. under pressure for about 10 minutes to reduce its scale forming tendencies during evaporation.

9. A method of conditioning steep water prior to evaporation, consisting in subjecting it at a pH below 5.0 and with a titrable acidity of not less than 10% (calculated as lactic acid and expressed as a percentage of the dry substance) to a temperature of about 250° F. to 300° F. for a period of time between 5 minutes and 30 minutes in order to convert the natural scale-forming substances into substances which will not form scale during subsequent evaporation.

10. A method of treating steep water comprising heating it under pressure in dilute state to temperatures considerably in excess of its boiling temperature at atmospheric pressure to effect a substantial amount of precipitation of solids therein, separating the precipitated solids, and evaporating the remaining steep water below said boiling point to a desired density, said pre-heating being so regulated as to render the steep water non-scale forming when evaporated.

REYNOLD P. JURGENSEN.
ARTHUR G. ROHWER.